Figure 1:
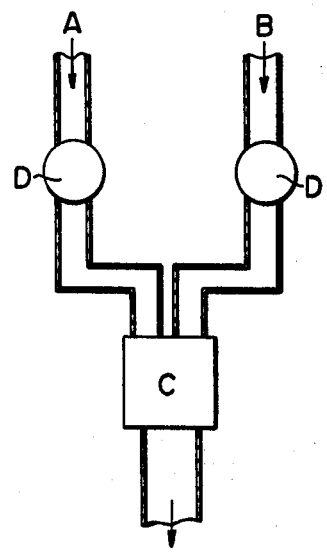

United States Patent [19]

Yasumatsu

[11] 4,079,154
[45] Mar. 14, 1978

[54] PREPARATION OF ACIDIFIED FOODS CONTAINING MILK PROTEIN

[76] Inventor: Mutsuo Yasumatsu, 5-41-6, Shimouma, Setagaya Tokyo, Japan

[21] Appl. No.: 651,782

[22] Filed: Jan. 23, 1976

[51] Int. Cl.$^2$ .......................... A23J 3/00; A23C 23/00
[52] U.S. Cl. .................................... 426/583; 426/656; 426/657; 426/519
[58] Field of Search ................. 426/583, 656, 657, 39, 426/519

[56] References Cited

U.S. PATENT DOCUMENTS

| | | | |
|---|---|---|---|
| 2,818,341 | 12/1957 | Niemann | 426/519 |
| 3,079,263 | 2/1963 | Foster et al. | 426/39 |
| 3,432,306 | 3/1969 | Edwards | 426/583 |
| 3,882,250 | 5/1975 | Loter et al. | 426/39 |
| 3,953,610 | 4/1976 | Little | 426/39 |

*Primary Examiner*—Jeanette M. Hunter
*Attorney, Agent, or Firm*—Browdy and Neimark

[57] ABSTRACT

A process for preparing a food material with a pH lower than the isoelectric point containing milk protein without stabilizer which is stable and free of precipitation of protein and can be utilized for making various foods such as desserts and drinks, by feeding simultaneously a solution of a protein and a solution of an acid continuously and proportionally and mixing them substantially promptly.

7 Claims, 2 Drawing Figures

PREPARATION OF ACIDIFIED FOODS CONTAINING MILK PROTEIN

It is a primary object of the present invention to provide a process for preparing a food material containing milk protein (hereinafter referred to as "FMMP") having a pH lower than the isoelectric point, which can be utilized in various manners for making various foods such as desserts and drinks.

Another object of the present invention is to provide a process for preparing stable FMMP having a refreshing taste and being free of precipitation of milk protein.

Still another object of the present invention is to provide a process for preparing FMMP very simply with economical advantages without using particular food additives or performing an additional treatment such as heat treatment.

A further object of the present invention is to provide a process for making foods selected from jellies, frozen desserts and "ready-to-drink" drinks by using FMMP prepared according to the present invention.

In the art there is not known an invention having the same objects as those of the present invention. However, some methods have been developed for preventing precipitation of milk protein, but in most of these prior art techniques, a stabilizer such as gum is used as disclosed in, for example, the specification of U.S. Pat. No. 3,432,306. Use of such stabilizer results in increase of the viscosity of the solution even if not desired. Accordingly, the properties of resulting FMMP are limited by the use of the stabilizer and hence, these known methods are not suitable for production of FMMP utilizable for various foods as intended in the present invention.

Further, stabilizers have their own taste or flavor and impart it to food materials, damaging taste or flavor inherent of food materials frequently. Still further, the activity of stabilizers is readily changed by the action of an acid [see Thomas E. Furia: Handbook of Food Additive, 2nd edition, 303 (1972), published by CRC Press]. Still in addition, many consumers dislike use of food additive at the present time.

In order for food materials to have a versatile utility in the art of foodstuffs, it is important that use of additives should be avoided as much as possible, their properties should not be limited and that they should retain basic simple excellent properties.

As a result of my research works made with a view to attaining the foregoing objects of the present invention and developing a process in which an additional treatment such as heating need not be conducted, I found that very remarkable desirable effects can be obtained by feeding simultaneously a solution of a protein and a solution of an acid continuously and proportionally and mixing the two solutions substantially promptly, preferably under some specific conditions described below. Based on this finding, I have now completed the present invention.

Figure 2:
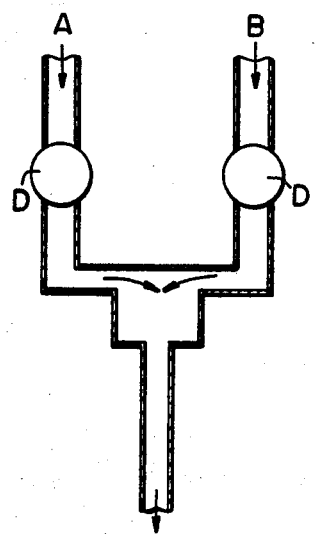

The present invention will now be described in detail by reference to the accompanying drawings, in which FIGS. 1 and 2 show examples of the liquid feed and mixing device to be used in the process of the present invention and reference symbols A, B, C and D denote a protein solution, an acid solution, an in-line mixer and a pump or liquid feed device, respectively.

The process of the present invention comprises feeding simultaneously a solution of a protein and a solution of an acid continuously and proportionally and mixing the two solutions substantially promptly. This mixing process in which the two solutions are simultaneously fed continuously and proportionally and mixed substantially promptly can be accomplished sufficiently by a proportional mixing system customarily adopted in the art for the premixing method, such as Meyer system, Mojonnier system, H & K system or the like, but in the present invention the mixing system is not limited to these conventional proportional mixing systems. Further, the mixing ratio of the protein solution to the acid solution is not limited to the mixing ratio customarily adopted in preparation of drinks.

The process of the present invention is not a mixing process in which the entire amount of a protein solution is first charged into a tank and an acid solution is gradually added to effect mixing nor a mixing process in which the entire amount of an acid solution is first charged into a tank and a protein solution is gradually added to effect mixing. In the process of the present invention, the two solutions are simultaneously fed and mixed continuously and proportionally. The present invention also includes a process in which the two solutions are simultaneously fed and mixed continuously and proportionally in a tank (provided with an agitator) and a process in which no tank is employed and both the solutions are simultaneously fed and mixed continuously and proportionally by using an in-line mixer.

In practicing the process of the present invention, it is preferred to use an in-line mixer as mixing means. Since the use of an in-line mixer facilitates the operation of mixing promptly and continuously a solution of a protein and a solution of an acid fed little by little proportionally, the purpose of the invention for feeding simultaneously the two solutions continuously and proportionally and mixing them substantially promptly can be ideally attained by the use of an in-line mixer. Further, there is attained an advantage that production can be performed at an elevated manufacturing rate or the plant area can be effectively utilized.

The process of the present invention can be practiced batchwise by using a large tank provided with stirring wings. In this case, however, since the mixture of the two solutions is accumulated at a high speed, the substantial mixing speed is gradually lowered. Further, as the rotation power of stirring wings is increased, formation of bubbles is enhanced and the quantity of air included in the mixture is increased. Therefore, better results are not obtained in this case. In view of this fact, in practicing the process of the present invention, especially on an industrial scale for mass-production, it is preferred to use an in-line mixer as mixing means.

The mixing process of the present invention will now be described by reference to the accompanying drawings. In FIGS. 1 and 2, reference symbols A, B, C and D denote a protein solution, an acid solution, an in-line mixer and a pump or liquid feed device that can be used instead of the pump, respectively. Arrows show flowing directions of the solutions and mixture.

In an embodiment shown in FIG. 2, a so-called mixer is not disposed. In this embodiment, the intended objects of the present invention can be sufficiently attained if solutions A and B are simultaneously fed continuously and proportionally at suitable speeds so that the two solutions are caused to impinge against each other and continuously mixed. In the process of the present invention, whether the embodiment of FIG. 1 or 2 or other embodiment may be adopted, it is the most important that a protein solution and an acid solution should be simultaneously fed continuously and proportionally. And thereafter the thus fed protein solution and acid solution should be mixed substantially promptly to fulfil the present invention.

By the term "a solution of a protein" or "a protein solution" used in the instant specification and claims is meant a solution containing at least one member selected from the group consisting of milk, powdery milk, condensed milk, milk casein and whey protein. Milk, powdery milk and condensed milk include skimmed products as well as unskimmed ones. In the present invention, use of a protein solution containing skimmed milk is especially preferred because it provides FMMP with a refreshing and full flavor and a better preservation.

As the protein concentration is increased in the protein solution, also the viscosity is increased and various disadvantages are brought about. For example, a large quantity of air is included in the solution, it becomes difficult to feed the solution promptly, and it also becomes difficult to mix the protein solution with the acid solution promptly. Therefore, it is preferred that the protein concentration in the protein solution be not higher than 8 w/w %, especially from 1.5 to 2.0 w/w %.

By the term "a solution of an acid" or "an acid solution" used in the instant specification and claims is meant a solution containing at least one member selected from the group consisting of lactic acid, citric acid, tartaric acid, malic acid, fumaric acid and phosphoric acid. Among these acids, citric acid most familiar through citrus fruits is preferred because it provides a good refreshing flavor and has a better harmony with the protein solution.

The acid concentration should be adjusted so that the pH of FMMP is lower than the isoelectric point, and the use of an acid solution having a low concentration is preferable to the use of an acid solution having a high concentration. More specifically, in the present invention, it is preferred that the acid concentration in the acid solution be 0.08 to 0.6 w/w %, especially 0.28 to 0.35 w/w %. As the acid concentration is high in the acid solution, the amount of the acid solution is much reduced as compared with the amount of the protein solution, and therefore, there is brought about a disadvantage that continuous and proportional mixing becomes difficult as explained below about the high mixing ratio.

By feeding simultaneously the protein solution and acid solution continuously and proportionally and mixing them substantially promptly, FMMP which is stable and free of precipitation can be obtained. If the mixing is adjusted so that the protein concentration in resulting FMMP is not higher than 0.8 w/w %, stable FMMP can be prepared promptly. When the protein concentration in resulting FMMP is lower than 0.25 w/w %, no good taste or flavor can be obtained because sourness alone is conspicuous.

The mixing ratio of the protein solution and acid solution to be adopted in the present invention will now be described.

In the present invention, it is preferred that both the solutions be fed and mixed at such a ratio that the acid solution is mixed in an amount of 3 to 9 parts by weight, especially 3 to 4 parts by weight, per part by weight of the protein solution. When this mixing weight ratio is too high, for example, 1:100, the working disorder of equipment is apt to result in much fluctuation of the mixing ratio, and thereafter it becomes disadvantageous to perform mixing continuously and proportionally as intended in the present invention. In the instant specification and claims, the mixing ratio of the two solutions is expressed on the weight base. However, in the actual operation, the mixing ratio is often determined on the volume basis because of the structure and mechanism of equipment. In this case, the above mixing ratio expressed on the weight basis may be converted to that on the volume basis.

As is apparent from the foregoing illustration, according to the present invention, FMMP is prepared very simply from necessary starting materials alone without using any particular food additive or without performing any particular additional treatment such as heating and the objects of the present invention can be attained very conveniently. This effect is quite surprising. In the present invention, since a high temperature heat treatment need not be performed for dispersing proteins stably, the process of the present invention can be worked conveniently even in the absence of a high temperature heat treatment equipment. Since no adverse effects are brought about in the present invention even if the heat treatment is conducted, it is possible to add the heat-treating step to the process of the present invention for sterilizing FMMP.

Practical procedures of the process of the present invention will now be described.

A water for dilution is fed into a transport line where an acid is dissolved therein, to form a dilute aqueous solution of the acid, and this acid solution is mixed with a protein solution fed through another line—a syrup line according to the process of the present invention. In the conventional steps of preparing acidified foods, a concentrated acid is added to a solution of other starting materials (such as plant extract) to form a base liquid (in many cases, a syrup containing sugar), and the thus formed base liquid (syrup) containing the concentrated acid is mixed with a water for dilution. According to the present invention, there is provided a novel process for production of acidified foods in which the acid is fed from a route different from the route for syrup and it is added to water on the side of the transport line independently from syrup. The above-mentioned conventional method involves a risk that the concentrated acid in the base (syrup) deteriorates other starting materials. Especially when the operation has to be stopped by an accident or the like and the holding time of the base is prolonged, this risk is enhanced. In contrast, the above method according to the present invention does not include such risk and further spaces and parts to which an acid-resistant material (stuff) is applied can be greatly reduced as compared with the case of the conventional method.

The reason why a prominent effect of preventing precipitation of protein is attained according to the process of the present invention will now be described.

As is illustrated in Example 1 given hereinafter, the OD value (the optical density as measured at 500 m$\mu$) of FMMP prepared according to the present invention is much lower than that of FMMP prepared according to the conventional method. In view of this fact, it is believed that in the process of the present invention formation of large protein particles is prevented and only small protein particles are formed at all times simultaneously with mixing of the protein solution and the acid solution. It is also believed that this small particle size of the resulting protein particles contributes to improvement of the refreshing effect in the taste or flavor together with other factors.

FMMP prepared according to the present invention can be broadly used for production of various foods, and this FMMP has a stably dispersed protein and a refreshing taste or flavor. The versatility of FMMP prepared according to the present invention will now be described.

An agar jelly can be prepared by mixing FMMP with agar. Further, diet drinks can be prepared by adding an artificial sweetener such as saccharin and a flavoring agent to FMMP prepared according to the present invention. Still further, fruit juice-containing drinks can be prepared by mixing a fruit juice with FMMP prepared according to the present invention. Still in addition, a "ready-to-drink" carbonated drink can be prepared by incorporating sugar, a flavoring agent, carbonic acid gas and the like into FMMP prepared according to the present invention. Other various foods and drinks can be prepared by utilizing FMMP prepared according to the present invention. If desired, a sweetener such as sugar or an artificial sweetener, a plant or vegetable extract, a flavoring agent, a preservative and the like may be added appropriately at an optional stage of the process of the present invention, though this feature is not directly intended by the present invention.

The objects, structure, effects and uses of the present invention will be more apparent from the following Examples that by no means limit the scope of the present invention. As many apparently widely different embodiments of the present invention may be made without departing from the spirit and scope thereof, it is to be understood that the present invention is not limited to the specific embodiments thereof except as defined in the appended claims.

EXAMPLE 1

The following methods (b) and (c) for mixing a protein solution and an acid solution while feeding simultaneously the two solutions continuously and proportionally according to the present invention were compared with the conventional mixing method (a).

Method (a)

A 2000-l volume cylindrical tank provided with stirring wings of the propeller type was filled with 760.8 Kg of a 0.321 w/w % aqueous solution of citric acid, and 239.2 Kg of a 1.59 w/w % protein aqueous solution formed by dissolving powdery skimmed milk into water was continuously added at a rate of 23.92 Kg/min to the acid solution being agitated to thereby obtain FMMP.

Method (b)

239.2 Kg of the same 1.59 w/w % protein solution as used above and 760.8 Kg of the same 0.321 w/w % aqueous solution of citric acid as used above were simultaneously and continuously poured into a 40-l volume vessel at flow rates of 23.92 Kg/min and 76.08 Kg/min (1:3.18), respectively. The flow-mixing was thus conducted while adjusting the exhausting rate so that 30 l of the mixture of the two solutions were always present in the vessel, to thereby obtain FMMP.

Method (c)

239.2 Kg of the same 1.59 w/w % protein solution as used in (a) above and 760.8 Kg of the same 0.321 w/w % aqueous solution of citric acid as used in (a) above were fed at flow rates of 23.92 Kg/min and 76.08 Kg/min (1:3.18), respectively, into a static mixer (Model 2½- 30 - 42 - 3 - 8 manufactured by Kenics Co.: element number = 18), to thereby perform in-line mixing and obtain FMMP.

Two samples of the final product were collected in respect to each of the foregoing methods (a), (b) and (c) (the total number of the collected samples being 6). Each of the final FMMP products obtained by the above three methods had an acidity of 0.244 w/w % and a protein concentration of 0.380 w/w %. Just after samples were collected, parts thereof were sampled and diluted 5 times by using distilled water, and the OD value was determined by measuring the absorbance at 500 m$\mu$. It is generally considered that between the OD value and the stability of a protein dispersion there is established such a relationship that as the OD value is low, protein particles are dispersed finely and uniformly and hence, the stability is high. Separately, 0.03 w/w % of benzoic acid was added to each sample and the mixture was allowed to stand still at 20° C. for 6 months, and the state of formation of precipitates was examined. Results obtained are summarized in Table 1.

Table 1

| Run No. | OD Value (500 m$\mu$) | | Precipitation State | |
|---|---|---|---|---|
| | 1 | 2 | 1 | 2 |
| Method (a) | 0.652 | 0.668 | ++ | ++ |
| Method (b) | 0.405 | 0.410 | + | − |
| Method (c) | 0.355 | 0.359 | − | − |

−: no precipitation
+: slight precipitation
++: much precipitation

From the foregoing results, it is seen that OD values of samples of FMMP obtained according to the methods (b) and (c) of the present invention were much lower than OD values of samples of FMMP prepared according to the conventional method (a). Accordingly, it will readily be understood that the process of the present invention manifests a very remarkable effect of preventing precipitation.

EXAMPLE 2

In conventional methods for preparing acid-added milk, a highly concentrated acid solution is used. The following experiments demonstrate that in the process of the present invention, better results are obtained by the use of a dilute acid solution than by the use of a concentrated acid solution.

Experiment (a)

232 Kg of a 2.36 w/w % protein solution prepared by dissolving powdery skimmed milk into water and 768 Kg of a 0.351 w/w % aqueous solution of citric acid were fed into the same static mixer as used in Example 1 at flow rates of 23 Kg/min and 76.15 Kg/min (1:3.31), respectively, to thereby effect in-line mixing and obtain FMMP.

Experiment (b)

232 Kg of the same protein solution as used in (a) above and 5.9 Kg of a 45.7 w/w % aqueous solution of citric acid were subjected to in-line mixing at flow rates of 46 and 1.17 Kg/min (39.3:1), respectively. Then, the so obtained acidified milk and water were subjected to in-line mixing at flow rates of 23.79 and 76.21 Kg/min, respectively. In this manner, FMMP was prepared by using a concentrated acid solution.

With respect to each of experiments (a) and (b) three samples were collected. In these samples of the final FMMP products, the acidity was 0.270 w/w % and the protein concentration was 0.547 w/w %.

Each sample was stored at 10° C. and occurrence of precipitation was examined. In each of samples prepared in the experiment (a), precipitation was not observed at all, but in samples obtained in the experiment (b) precipitation was caused after lapse of 2 weeks. From these results, it will readily be understood that in practicing the process of the present invention, better results are obtained by the use of a low concentration acid solution than by the use of a concentrated acid solution customarily used in the art.

EXAMPLE 3

100 Kg of a 5.7 w/w % aqueous solution of sodium caseinate as the protein solution and 600 Kg of a 0.089 w/w % aqueous solution of phosphoric acid as the acid solution were subjected to flow-mixing in the same manner as in Example 1 at flow rates of 25 Kg/min and 150 Kg/min (1:6), respectively, to thereby prepare 700 Kg of stable FMMP. An example of the use of this FMMP is described below.

3.5 Kg of this FMMP was charged in a vessel, and 0.48 Kg of sugar was further charged in the vessel. The resulting sugar-added solution was heated at 70° C. in a steam chamber and 40 g of powdery agar-agar was added thereto. The mixture was agitated and heated at 100° C. for 2 minutes while agitating it now and then, to thereby dissolve the powdery agar-agar. Then, the mixture was cooled to 80° C. and 5 g of a lemon flavoring agent was promptly added thereto. The resulting processed solution was poured into cups having a volume of 100 ml and stored in a refrigerator to gel agar-agar and prepare a unique agar jelly having a beautiful milky white color and a refreshing sour taste.

EXAMPLE 4

200 Kg of a 2.6 w/w % protein solution was prepared by diluting condensed skimmed milk with water. Separately, 600 Kg of a 0.44 w/w % aqueous solution of citric acid was prepared.

Both the solutions were fed into the same static mixer as used in Example 1 at flow rates of 40 Kg/min and 120 Kg/min (1:3), respectively, to effect in-line mixing and obtain FMMP. When sugar was added to this FMMP, a soft drink was prepared. Utilization of this FMMP for production of a jelly is described below.

3.5 Kg of this FMMP and 480 g of sugar were charged in a vessel, and the resulting sugar-added milk was heated at about 70° C. and 50 g of powdery gelatin was added thereto. The mixture was agitated to dissolve gelatin and 5 g of an orange flavoring agent was added thereto promptly. The resulting processed solution was cooled with ice water under gradual agitation. When the solution of the viscosity was elevated to a certain prescribed level (where bubbles formed by agitation rised gradually), the solution was promptly poured into cups having a volume of 60 ml and stored in a refrigerator to gel gelatin and form a jelly.

EXAMPLE 5

Water was added to fresh sterilized skimmed milk prepared by skimming raw milk to obtain 200 Kg of a 3.0 w/w % protein solution, and 1.3 Kg of sodium cyclamate, 100 g of sodium saccharin, 750 g of a 20 w/w % solution of benzoic acid in ethyl alcohol and 2 Kg of a lemon flavoring agent were incorporated and dissolved in the above protein solution. The so prepared sweetener-added protein solution and 800 Kg of a 0.28 w/w % aqueous solution of lactic acid were fed into the same static mixer as used in Example 1 at flow rates of 20 Kg/min and 80 Kg/min (1:4) respectively, to effect in-line mixing and obtain FMMP. Then, 1.5 gas-volumes of carbonic acid gas was dissolved in this FMMP and filled in cans to obtain a diet drink.

EXAMPLE 6

A 1.86 w/w % protein solution formed by diluting whole milk with water and a 0.168 w/w % aqueous solution of citric acid were subjected to flow-mixing at flow rates of 25 Kg/min and 125 Kg/min (1:5) respectively, to obtain 1050 Kg of FMMP. An example of utilization of this FMMP is described below.

36 Kg of this FMMP was heated at about 70° C. and a mixture of 11 Kg of sugar, 4.5 Kg of dextrose, 0.125 Kg of gelatin and 0.125 Kg of pectin was added to FMMP under sufficient agitation and dissolved in FMMP. Then, 80 g of a 20 w/w % solution of benzoic acid in ethyl alcohol and 70 g of a strawberry flavoring agent were promptly added to the above solution. The so processed solution was poured into cups having a volume of 150 ml. Then, a thin wood stick was inserted into each of the cups, and the cups were stored in a refrigerator to gel gelatin and prepare ice sticks.

Based on the disclosure given in the specification, the following claims have now been claimed. FMMP prepared by the process in which 1 part by weight of a skimmed milk solution having a protein concentration of 1.5 to 2.0 w/w % is mixed with 3 to 4 parts by weight of an aqueous solution of citric acid having an acid concentration of 0.28 to 0.35 w/w %, had a beautiful stable white turbidity and a refreshing taste. It is quite surprising that such excellent products can be obtained even at such low protein concentrations.

What is claimed is:

1. A process for the preparation of acidified food materials containing milk protein, with a pH lower than the isoelectric point, in which the protein does not precipitate, without the use of a stabilizer, comprising:
    simultaneously and continuously combining starting materials consisting essentially of a solution of a protein and a solution of an acid, at a constant ratio selected from within the proportions of 1 part by weight of protein solution having a protein concentration not higher than 8 w/w % and 3–9 parts by weight of acid solution having an acid concentration of 0.08 to 0.6 w/w %, said proportion being selected such that the protein concentration in the resulting food material is not higher than 0.8 w/w %, to produce a combined solution with a pH lower than the isoelectric point; and
    mixing the combined solutions substantially promptly while maintaining said constant ratio.

2. A process according to claim 1 wherein the mixing is performed by using an in-line mixer.

3. A process according to claim 1 wherein 1 part by weight of a skimmed milk solution having a protein concentration of 1.5 to 2.0 w/w % is mixed with 3 to 4 parts by weight of an aqueous solution of citric acid having an acid concentration of 0.28 to 0.35 w/w %.

4. A process according to claim 3 wherein the mixing is performed by using an in-line mixer.

5. A process in accordance with claim 1, wherein said solution of a protein consists of a solution consisting of water and at least one member selected from the group consisting of milk, powdery milk, condensed milk, milk casein and whey protein, said milk, powdery milk and condensed milk being skimmed or unskimmed.

6. A substantially stable acidified food material containing milk protein with a pH lower than the isoelectric point, without protein precipitation and without stabilizers, comprising the product of the process of claim 1.

7. A substantially stable acidified food material containing milk protein with a pH lower than the isoelectric point, without protein precipitation and without stabilizers, comprising the product of the process of claim 3.

* * * * *